United States Patent [19]

Richard

[11] Patent Number: 5,112,089
[45] Date of Patent: May 12, 1992

[54] RAPID ASSEMBLY CONNECTOR

[75] Inventor: Denis Richard, Choisy-le-Roy, France

[73] Assignees: Automobiles Peugeot; Automobiles Citroen, both of France

[21] Appl. No.: 275,133
[22] PCT Filed: Feb. 2, 1988
[86] PCT No.: PCT/FR88/00053
 § 371 Date: Oct. 3, 1988
 § 102(e) Date: Oct. 3, 1988
[87] PCT Pub. No.: WO88/05882
 PCT Pub. Date: Aug. 11, 1988

[30] Foreign Application Priority Data

Feb. 3, 1987 [FR] France ............... 87 01499

[51] Int. Cl.⁵ .............................................. F16L 21/06
[52] U.S. Cl. ..................................... 285/321; 285/356
[58] Field of Search ....................... 285/321, 356, 305

[56] References Cited

U.S. PATENT DOCUMENTS

| 2,619,367 | 11/1952 | Hanson . | |
|---|---|---|---|
| 2,659,389 | 11/1953 | Harvey | 285/321 X |
| 2,935,343 | 5/1960 | Ellis | 285/39 X |
| 4,063,760 | 12/1977 | Moreiras | 285/321 X |
| 4,191,408 | 3/1980 | Acker | 285/356 X |
| 4,193,616 | 3/1980 | Sarson et al. | 285/321 X |
| 4,294,473 | 10/1981 | Ekman | 285/321 X |
| 4,621,843 | 11/1986 | Straub | 285/356 |
| 4,725,081 | 2/1988 | Bauer | 285/321 X |

FOREIGN PATENT DOCUMENTS

| 246148 | 12/1962 | Australia | 285/321 |
|---|---|---|---|
| 2250951 | 6/1975 | France . | |
| 2263449 | 10/1975 | France . | |

Primary Examiner—Dave W. Arola
Assistant Examiner—Heather Chun
Attorney, Agent, or Firm—Wong & Husar

[57] ABSTRACT

The invention has for an object a connector with rapid high pressure fastening, including a female element (1, 32 or 48) united to a connector organ and a male element (14, 24 or 40) fixed to a connector tube (15), including an O-ring seal (21 or 43) and a locking means (13 or 53).

According to the invention, the demountable locking means is composed of an elastic retaining ring (13) or a pin (53) retained by grooves (20, 25) and the toric openings (7, 23, or 31) or the apertures (46, 54) of the male and female elements.

7 Claims, 6 Drawing Sheets

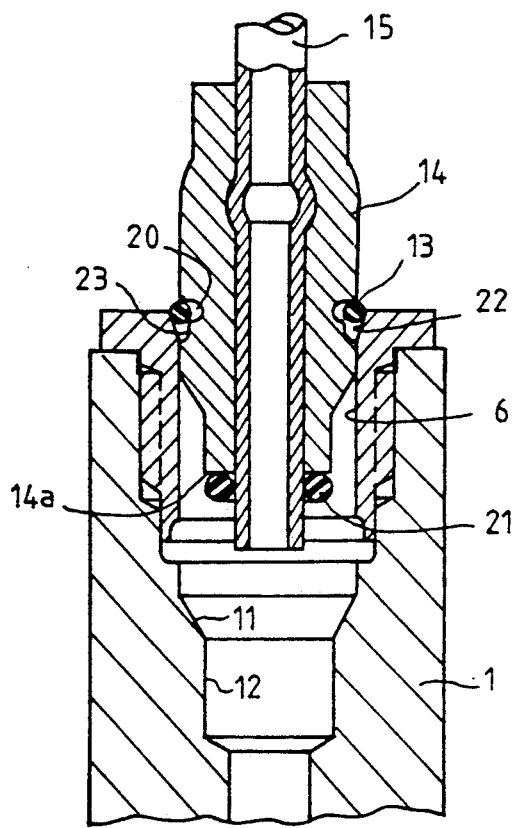
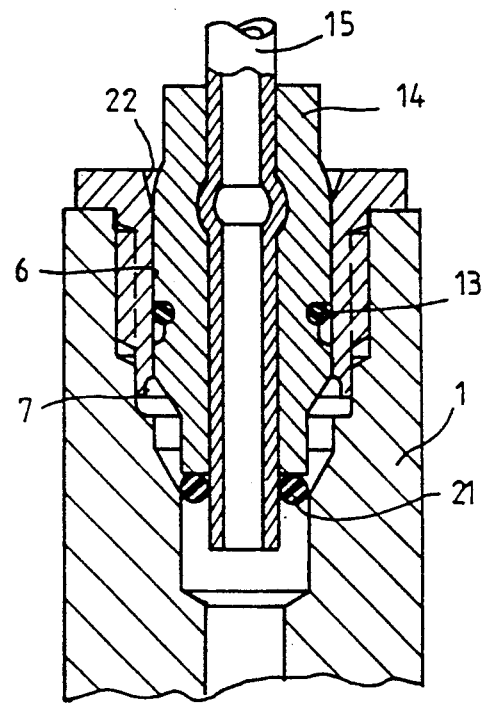
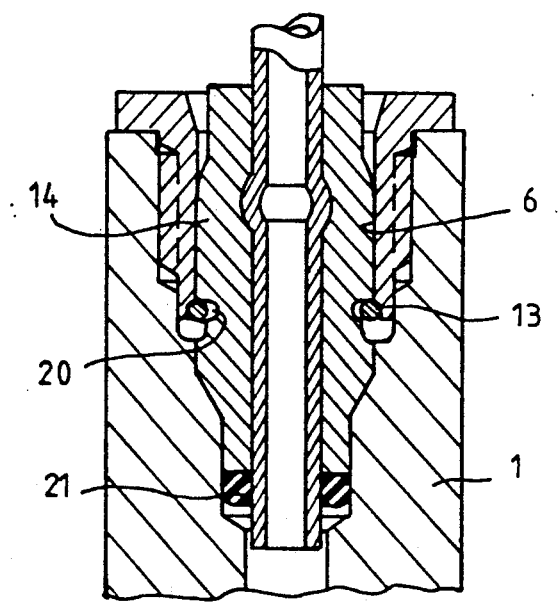
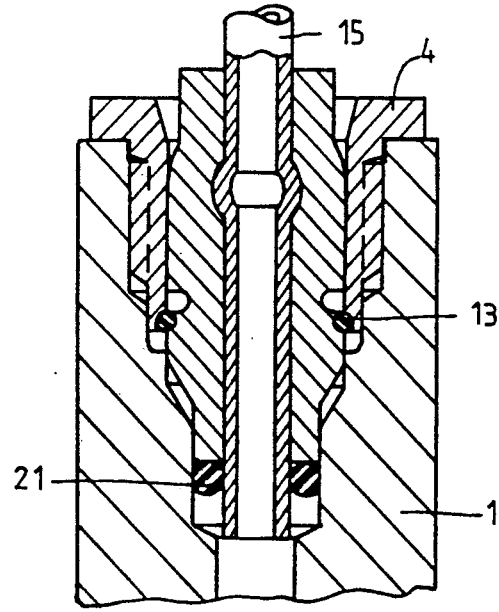

RAPID ASSEMBLY CONNECTOR

The present invention has for an object, a rapid assembly connector for hydraulic lines or pipes, including a female element integral with a connector piece and a male element fixed to a connector tube, and including an 0 ring seal and a locking means.

It concerns a connector of the type whose two elements can be assembled by a robot, that is without having to make a movement of translation accompanied by a force to assure latching, and later a force in a reverse direction for controlling the latching.

One knows of connectors of the type defined above, composed of a male element and a female element, including cylindrical parts adapted to slide, and conical parts and shoulders adapted to cooperate for the same axial displacement to produce deformation of the joint and latching of the locking means.

These connectors are usually provided to operate at low pressure and are not suitable for pressures corresponding to about one or several hundreds of bars.

The invention relates thus to a high pressure hydraulic connector whose assembly is effected in a single movement of translation and which is fully disconnectable.

An hydraulic connector according to the invention includes a female element integral with a connector piece, and a male element fixed to a connector tube and comprising an 0 ring seal and a locking means; the male element and the female element comprising the cylindrical parts adapted to slide, and conical parts and shoulders adapted to cooperate for the same axial displacement to produce deformation of the seal joint and latching of the locking means.

It is characterized by the disconnectable locking means, composed of an elastic retaining ring or a pin confined by the grooves and the toric supports or the bores of the male and female elements, after the application of the high pressure.

Preferably, the toric seal is confined between three surfaces, the first appurtenant on the connector tube, the second on the female element, and the third on the male element, the free surface of the joint being subjected in operation to the high pressure.

The first three embodiments apply in the case where the conduits of the connectors are aligned. A fourth embodiment in the case where the conduits are perpendicular.

According to the first three embodiments the female element comprises a conical portion adapted to cooperate with a shoulder of the male element for engaging the toric joint in a cylindrical portion of the female element whose diameter is less than the nominal diameter of the toric joint.

Preferably, in operation, the toric seal is compressed at its inner periphery by the connecter tube, at its outer periphery by the cylindrical portion of the female element, and is pressed by the high pressure onto the shoulder of the male element.

According to the fourth embodiment, the lock is composed of a pin allowing the straight parts to be disposed perpendicular to each other and engages in apertures of the male and female elements One will describe hereafter, as non limiting examples, various embodiments according to the invention, with reference to the accompanying drawings, in which:

FIG. 1 shows in axial section the two male and female connector elements of a first embodiment of the invention;

FIGS. 2 to 5 the assembling of the connector elements of FIG. 1 with the different steps of this assembling FIGS. 6 to 9 are views similar to FIGS. 2 to 5 of a second embodiment;

Figure 1:
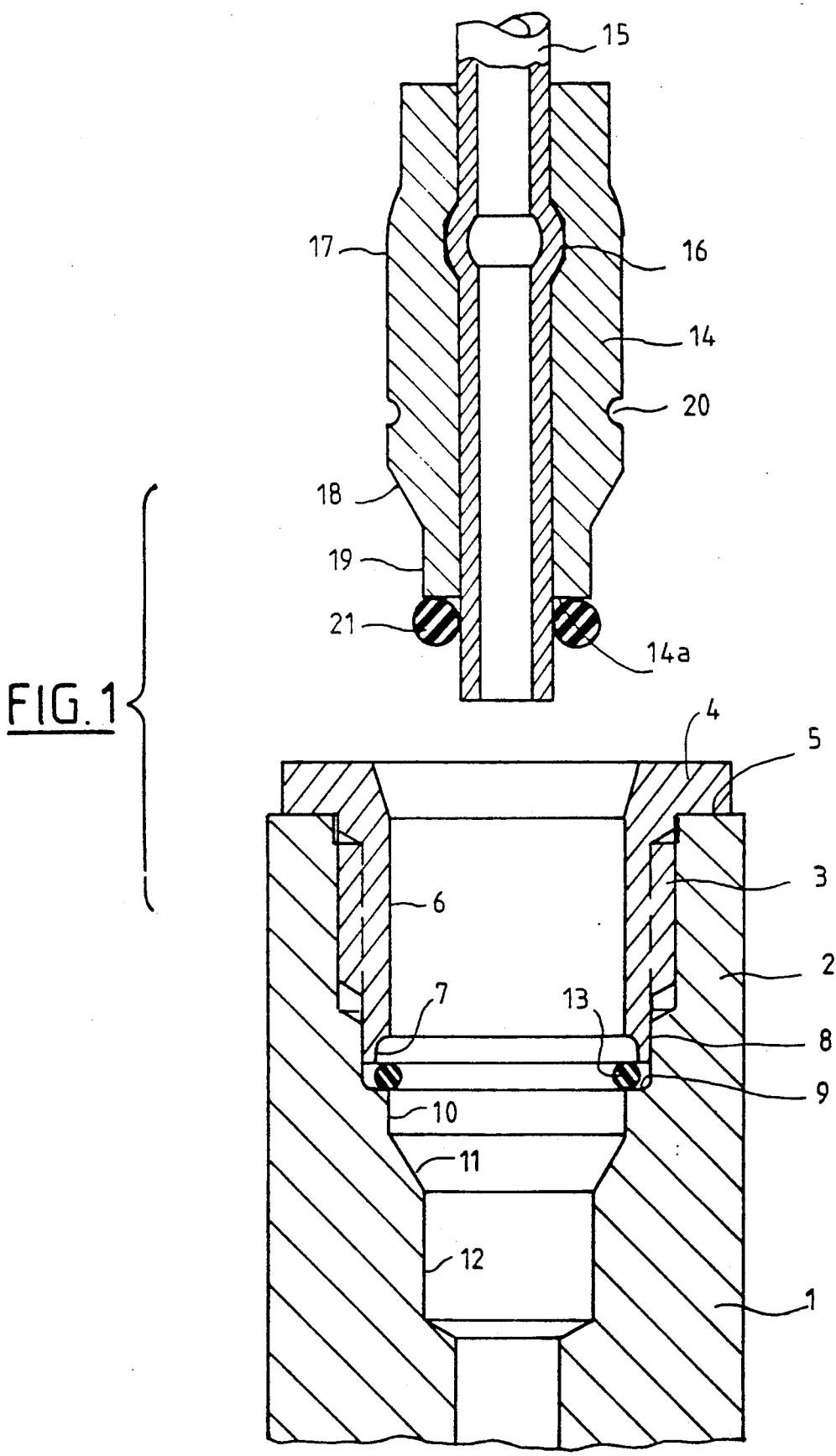

FIG. 1 shows the body 1 of an hydraulic device; this body, which constitutes the female element of the connector and is made, for example, by molding, presents a cylindrical boss 2 with an internal screw thread 3. A hollow shoulder screw 4 has a head in the form of a hexagon which clamps against the end face of the boss; this screw presents a cylindrical bore 6 which has a toric groove or seat 7. At its other end the body 1 has, beyond the screw thread 3, a cylindrical bore 8 joined by a shoulder 9 to a cylindrical portion 10, of the same diameter as the cylindrical bore 6, and which is itself joined by means of a truncated cone 11 to a cylindrical portion 12.

Before putting the hollow shoulder screw 4 in the thread 3, a split elastic retaining ring 13 whose nominal diameter is equal to the diameter of the toric groove 7, was introduced into the body. The ring rests on the shoulder 9.

A tubular sleeve 14 which constitutes the male element of the connector is fixed to a tube 15 formed for example of a double wall of steel sheet. This fixing can be assured by a bulge 16 made with a two part die and compressing punch; after positioning the sleeve on the tube 15, the sleeve is deformed to the rear of the bulge of the tube for example, by swaging or magnetostriction.

The sleeve 14 has a cylindrical bearing surface 17 of the same diameter as the bore 6 of the screw 4, and can thus slide in this bore.

This bearing surface 17 is extended by a truncated cone bearing surface 18 and a cylindrical bearing surface 19 whose shapes are complimentary respectively with the portions 11 and 12 of body 1. The surface 17 has a toric groove 20 whose diameter is equal to the diameter of ring 13. An 0-ring 21 is slid over the side of tube 15 and seated against the end face 14a of the sleeve 14, and is held in place by its own tension.

Figure 2:
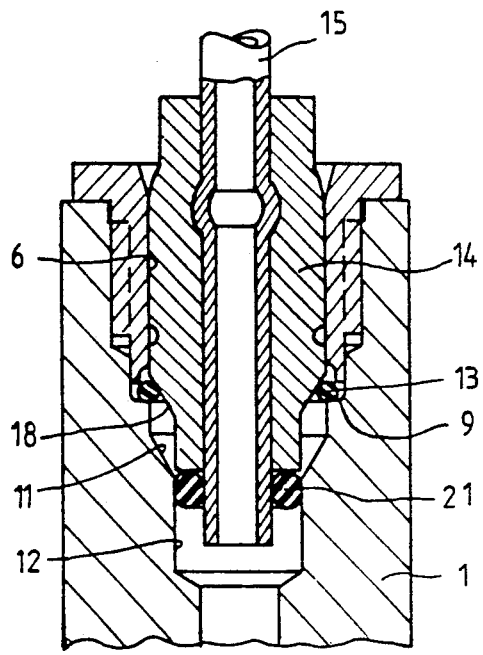

To assemble the connector, the tube 15 with its sleeve 14 and its 0-ring 21 is inserted in the bore 6; the assembly is slid until the 0-ring 21 comes into contact with the truncated cone 11 of body 1. Addition force is then applied to the sleeve 14 to compress the 0-ring 21 and cause it to pass into the bore 12 (FIG. 2). The retaining ring 13 then comes in contact with the truncated cone bearing surface of the sleeve.

Figure 3:
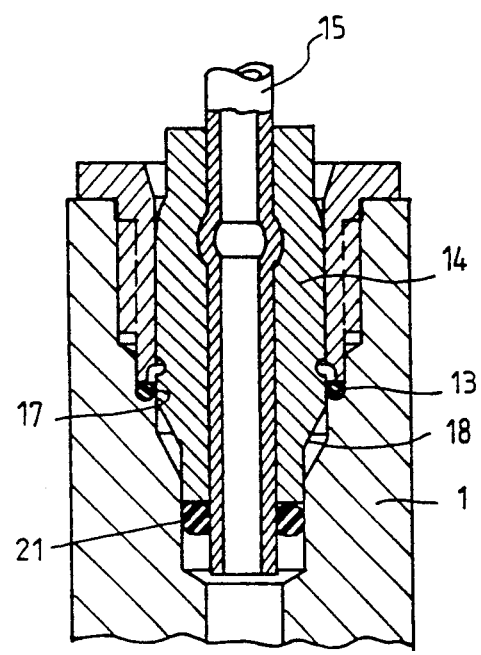
Figure 4:
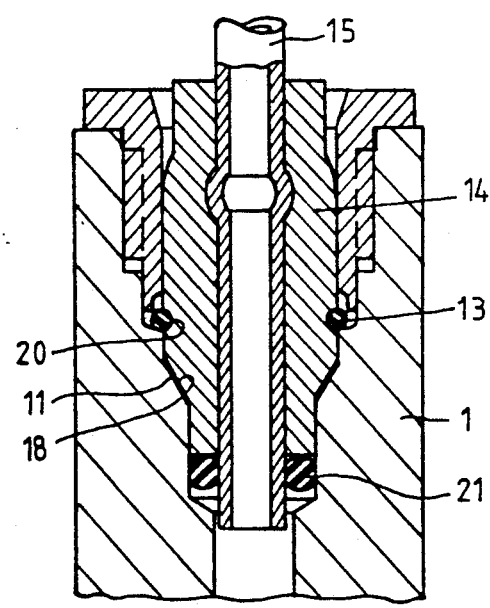

A slightly greater force is then applied to the sleeve so that the truncated cone bearing surface assures expansion of the retaining ring 13 and then passage onto the cylindrical bearing surface 17 (FIG. 3). The pressure is continued just until the retaining ring 13 seats in the groove 20 (FIG. 4). At the same time, the truncated cone bearing surface 18 of the sleeve abuts against the truncated cone 11 of the body 1. The mounting force can be increased but there is no risk of damage.

One notes that the seal 21 is confined between three surfaces appurtenant respectively to the outside diameter of the tube 15, the sleeve 14 (shoulder 14a) and the bore 12, the free surface of seal 21 being subjected to high pressure.

Figure 5:
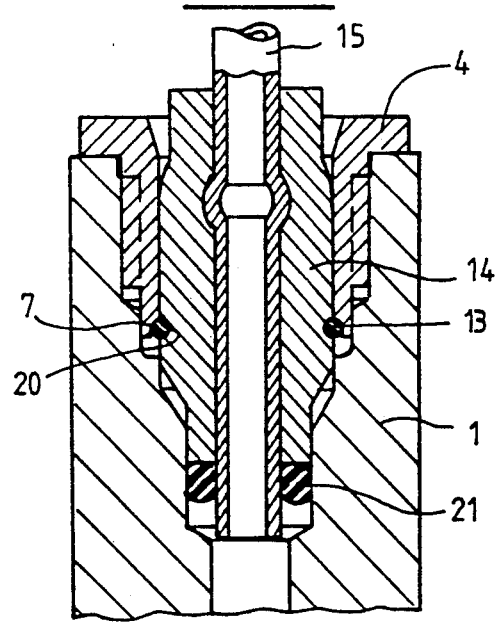

One can then apply a force in the opposite direction to place the elements in the position of FIG. 5; the retaining ring 13 trapped in the groove 20 comes to abut against the groove 7 and prevent the sleeve 14 from coming out. This placing in position is not mandatory because it moves back itself automatically when the first pressure is applied.

If, later, it is desired to separate the two elements of the connector from each other, it suffices to unthread the hollow shoulder screw 4.

In the variation of FIGS. 6 to 9, the bore 6 of the screw 4 opens to the outside with a conical bearing surface 22 and the sleeve has a toric surface 23 below (or downstream in the direction of insertion of the connector) the groove 20. The retaining ring 13, instead of being placed in the body 1, is initially put in this toric surface.

When the sleeve 14 is started into the body 1, the retaining ring 13 contacts the conical surface 22 and is shrunk into engagement with the groove 20 (FIG. 6).

Thus the seal 21 is compressed and put in place in the cylindrical portion 12 of body 1 (FIG. 7). The retaining ring 13 meets then the grove 7 of the screw 4 and disengages itself from the groove 20 and returns to its initial diameter (FIG. 8). By rearward return the retaining ring becomes trapped (FIG. 9) between the toric portion 23 of the sleeve and the groove or toric surface 7.

Figure 10:
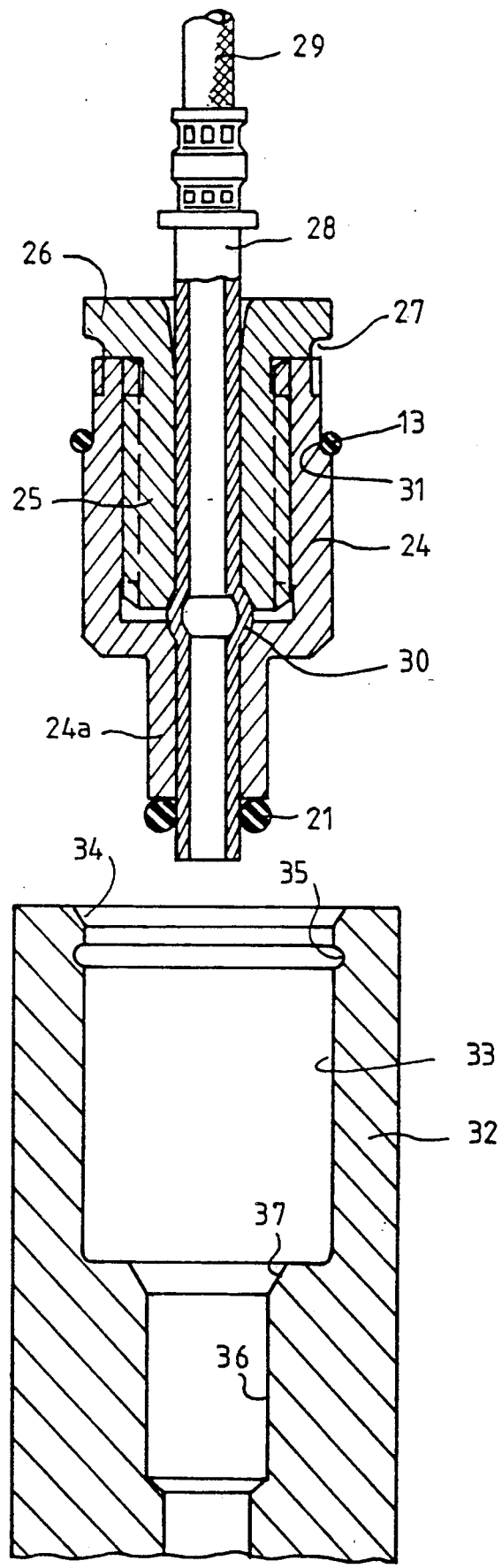
FIG. 10 is a view similar to FIG. 1 of a third embodiment.
Figure 11:
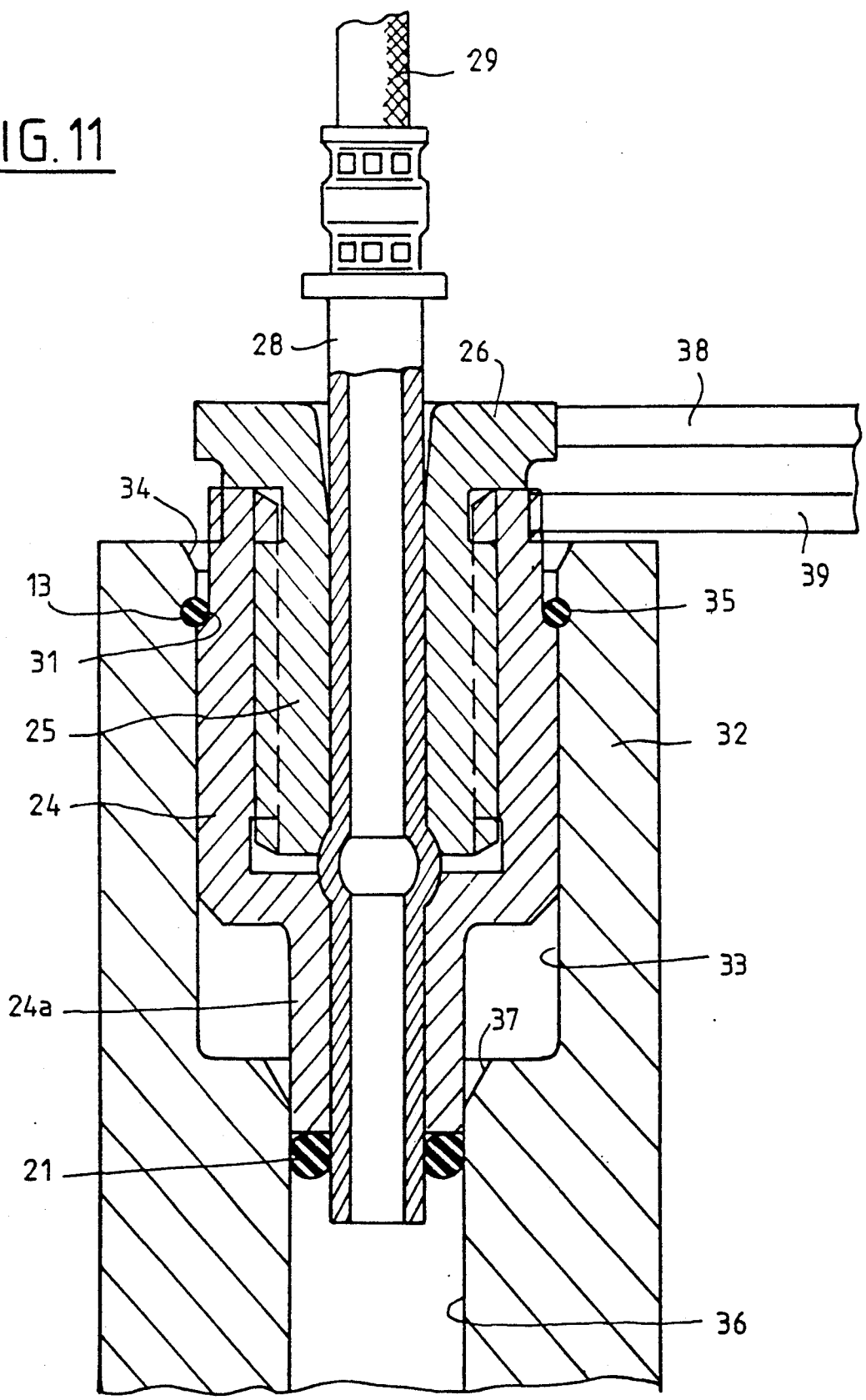
FIG. 11 shows the connector of FIG. 10 assembled.

In the embodiment of FIGS. 10 and 11 the connector includes a male element 24 whose end 24a is of a reduced diameter and into which is threaded, a hollow screw 25 whose head is enlarged as indicated as 26 to form a shoulder 27. This screw is traversed by a ferrule 28 on a flexible line 29 and is secured without play by an enlargement 30 of the ferrule. The retaining ring 13 seats on a shoulder or toric seat 31 of the element 24 and the seal 21 is disposed at the end of this element around the ferrule 28.

The female element 32 of the connector has a bore 33 whose diameter is equal to the outside diameter of the sleeve and which opens to the exterior through a chamfer 34. This bore has a toric groove 35 a short distance from the chamfer. The bore 33 is extended by a bore 36 to which it is joined by a chamfer 37 and whose diameter is equal to that of the end 24a of the sleeve 24.

The assembly of the male and female elements of the connector is done in the same manner as for the embodiments previously described. The seal 21 is compressed by the chamfer 37 and engages in the bore 36. Then the elastic retaining ring pushed by the shoulder 27 is compressed by the chamfer 34 and engages in the groove 35. Then, by a force in the reverse direction, or by the first application of pressure, the tube 29 and its ferrule 28 move back and the groove 31 of the element 24 comes to seat on the retaining ring 13 which becomes trapped (FIG. 11).

To separate the elements of the connecter, the hollow screw 25 is unthreaded with the assistance of wrenches 38 and 39. The hollow screw with the tube is removed and the bushing 24 is pushed into the element 32 until it abuts the bottom of the bore 33 of the element. The retaining ring is then found exposed and can be removed.

Figure 12:
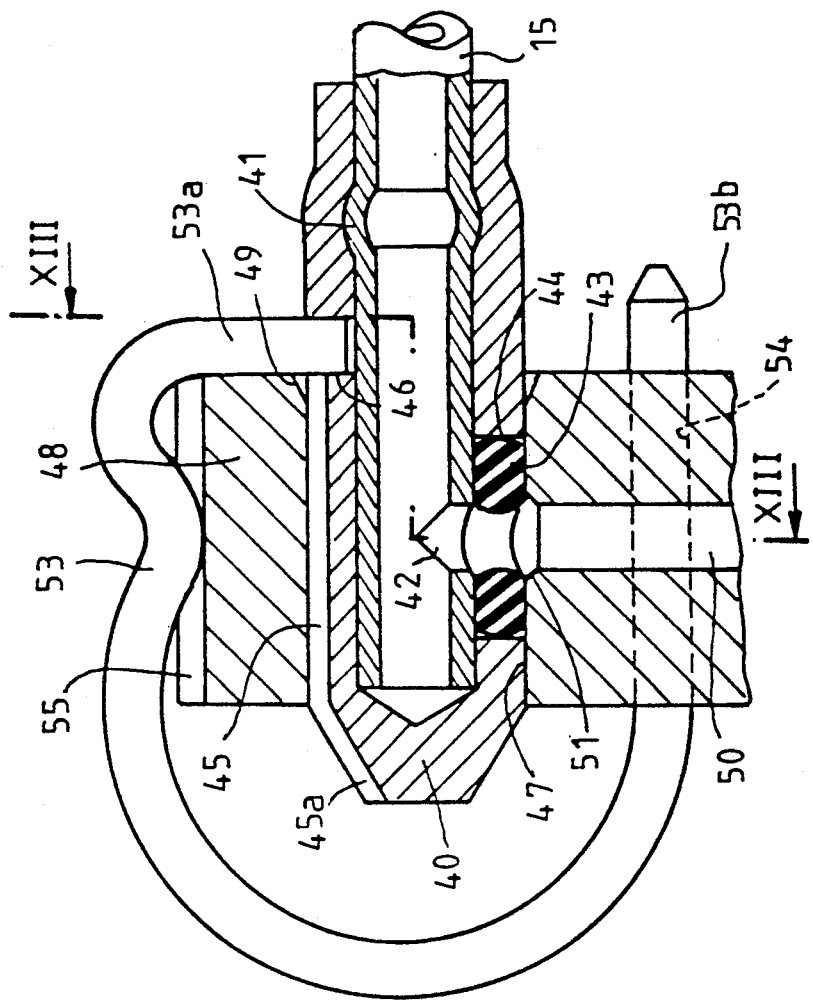
FIG. 12 shows a fourth embodiment in section, along XII—XII of FIG. 13.
Figure 13:
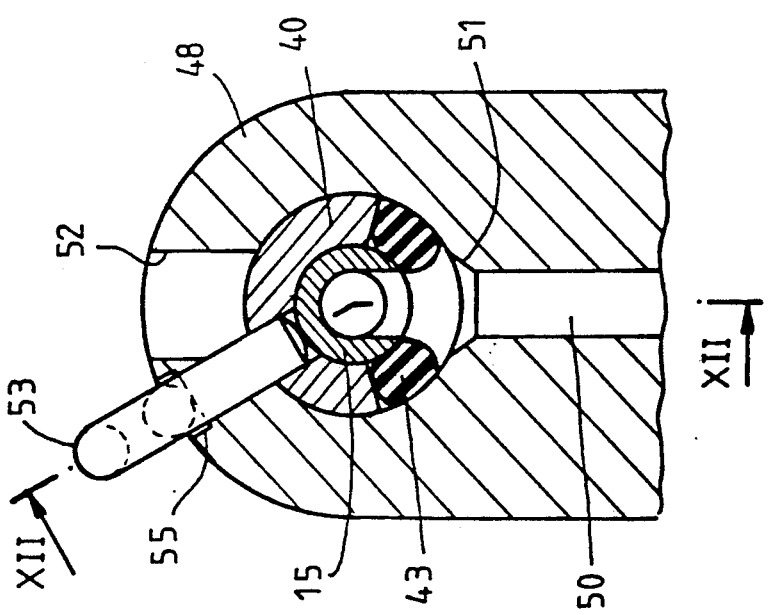
FIG. 13 is a view in transverse section along XIII-XIII of FIG. 12.

In the preceding embodiments, the conduits of the connector are aligned. The embodiment of FIGS. 12 and 13 apply to a connector for perpendicular conduits.

In this case the tube 15 is fitted into a closed end sleeve 40 and is fixed to the sleeve by an enlargement 41, the sleeve having been deformed to the rear of the enlargement of the tube for example, by swaging or magnetostriction. The tube 15 has a radial bore 42 positioned to face an annular seal 43 disposed in a bore 44 of the sleeve.

The end of the sleeve 40 is frustoconical and has an external groove 45 terminated at one of its ends by a hole 46 and has its other end on the frustoconical extremity of the sleeve as indicated at 45a.

The tube 15 with the sleeve 40 is mounted in a bore 47 of a fitting 48 of a connector means for tube 15, this bore having a flare 49 at its opening. This fitting has a bore 50 for passage of fluid, with a chamfer 51 opening into the bore 47. The numeral 52 designates a bore diametrically opposite the passage 50, of a greater diameter, and is provided to form the chamfer 51.

The tube can be fixed to the fitting by a pin 53 whose ends are oriented perpendicular to each other and engage respectively in the hole 46 of the sleeve 40 and in a bore 54 of the fitting 48. For this there is provided externally, a guide groove 55 in which the pin engages.

To fix the tube 15 to the fitting 48, the pin 53 is placed in the fitting and the tube is inserted in the flare 49, with the tip of the pin engaging in the sloping part 45a of the groove 45. Then the tube is pushed until the seal 43 contacts the flare 49. With additional force, the seat enters the bore 47 and comes to be placed on the chamfer 51 of the passage 50. At the end of the joining, the tip 53a of the pin 53 engages in the hole 46 and the assembly is locked.

The seal 43 is trapped between three surfaces appurtenant respectively to the outside diameter of the tube 15 (around the bore 42), to the sleeve 40 (bore 44) and the bore 47, the free surface of the seal being subjected to the high pressure.

This embodiment has the advantage that the tube/sleeve assembly is not subjected to dislocation forces.

It will be understood that the present invention is not to be considered limited to the various embodiments described and shown, but to cover, in addition, all variations.

I claim:

1. High pressure hydraulic connector for rapid connection comprising, a female connector and a male connector element fixed to a connector tube, and comprising, a toric seal on said tube adjacent said male element and a latchable lock ring, cooperating slidable cylindrical portions on said male element and female connector, and comprising, a first cylindrical wall of the female connector of a diameter less than the relaxed diameter of the toric seal and a second cylindrical wall of the female connector of a diameter greater than the diameter of the toric seal, a lock ring groove in said male element in a cylindrical wall slidable in the second wall of the female connector, a toric surface for said lock ring in said second wall of said female connector, a first conical portion on said female connector for compressing said toric seal of said male element into said first cylindrical wall, a second conical portion on said female connector, of larger diameter than said first conical portion, for compressing said locking ring, for the same displacement of the male connector element into the female connector to produce compression of both the seal and lock ring, said lock ring being demountable and being confined, after the application of high pressure, by the groove and the toric surface of the male element and female connector, and said toric seal being confined between said tube, said male element, and said first cylindrical wall of the female connector and having a free surface facing away from said male element, said free surface of the seal being subjected to high pressure so that the seal is pressed into sealing engagement with the tube, the male element and the first cylindrical wall of the female connector.

2. Connector according to claim 1 wherein said toric seal engages a shoulder of said male element which cooperates with said first conical surface of the female connector to compress the toric seal into the first cylindrical wall of the female connector.

3. Connector according to claim 2 wherein in operation, the toric seal is compressed at its internal periphery by the tube of the connector, at its external periphery by the first cylindrical wall of the female connector, and is pressed by high pressure against the shoulder of the male element.

4. Connector according to claim 1 wherein the lock ring is at its nominal diameter in the groove of the male element.

5. Connector according to claim 1 wherein the first conical portion of the female connector acts as a drive abutment for a conical portion of the male element to limit the extent of insertion of the male element into the female connector.

6. Connector according to claim 1 wherein, in use, the male element is pushed by high pressure acting on the toric seal to a position where the lock ring is trapped by the groove of the male element and the toric surface of the female connector.

7. Connector according to claim 1 characterized in that the toric surface of the female connector is formed in an end of a hollow shoulder screw whose axial bore is of the diameter of the male portion, so that the lock ring can be demounted after removing the shoulder screw.

* * * * *